2,969,281
PROCESS FOR MAKING SPHERICAL METAL PARTICLES

Walter T. Monson, Newark, N.J., assignor to American Metal Climax, Inc., New York, N.Y., a corporation of New York No Drawing. Filed Jan. 17, 1958, Ser. No. 709,462

7 Claims. (Cl. 75—.5)

This invention relates to the treatment of metals and metal alloys in particulate form. Especially, this invention relates to the making of spherical metallic particles from irregularly shaped metallic particles of metals or metal alloys and provides a method whereby spherical metal particles may be produced in a controlled size range and in a substantially 100% yield with the result that retreatment steps are made unnecessary. This feature of the invention is particularly advantageous for the treatment of relatively small quantities of precious or costly metals whereby spherical metal particles of these metals may be produced without incurring intolerable and expensive metal losses.

Heretofore, several methods for the production of particulate metallic material in spherical form have been employed, as illustrated by shotting of a metal melt in a tower, or the atomization of molten metals using a variety of apparatus and atomizing media. In general, the latter method is used to produce particulate metal fine enough to be called metal powder as distinguished from particles of larger size which are commonly referred to as shot.

While such methods have enabled the production of spherical powder or shot, they have been beset with several disadvantages. Principally, it has been the case that even under the best operating conditions using such methods, only a relatively small proportion of the metal input is obtained within a desired size range. Moreover the exacting requirements with respect to perfectness of form and soundness for such uses as metal filter elements, small bearings and the balls in pen points have even further limited the usable yield of spherical particles produced by such methods. Thus 50% or more of the original metal input must either be discarded or, as is more often the case, be retreated by re-melting and re-atomization to obtain spheres of adequate quality and in sufficient amounts. Besides being costly such retreatments also increase the risks of physical metal losses as well as chemical contamination of the product in the usually large and cumbersome equipment employed.

I have now discovered a simple and efficient way by which the aforesaid disadvantages are avoided and by which particulate metallic spheres of perfect shape and soundness may be made with a substantially complete conversion of the starting material to satisfactory spheres in any desired size range. My invention, which may be used utilizing various sources of starting material is also advantageously employed to effect a direct and economic retreatment of the non-specification material produced by other processes whereby the former disadvantages of retreatment are completely overcome.

Briefly stated my invention involves mixing suitably sized, irregularly shaped particles of the metal or metal alloy to be spherified with a material which is chemically unreactive with the metal or metal alloy (hereinafter termed matrix material) so as to provide a uniform suspension of the metal or metal alloy in the loose, unpacked matrix material. This suspension is then heated to a temperature sufficient to cause spheroidization of the metal or metal alloy after which the suspension is cooled and the spherified or spheroidized metal particles are separated from the matrix material. Not only may perfectly spherical particles of costly metals such as gold, silver, platinum, irridium and rhodium be readily and efficiently produced in accordance with this invention but the method herein disclosed is also equally applicable to the production of spherical particles of the baser metals such as copper, zinc, lead, tin and the like as well as alloys thereof.

For use in the present process, the metallic starting material may be any irregularly shaped particles of the metal or metal alloy to be spheroidized. Depending on the metal, such irregular particles are obtained from a variety of sources including cuttings, clippings, filings, grindings and electro-deposited particulates as well as irregular particles obtained by dispersing processes such as atomization and the like.

It has been found that, in general, the size range of the spheres produced from these irregular particles will correspond, within practical limits, to the size range of the irregular particles used. Thus a sufficiently adequate control of sphere size for most purposes may be effected by suitable sizing of the initial starting material as, for example, by screening or other classification. Good results are obtained using irregular particles as large as 8 mesh (U.S. Standard Screen) size and excellent spheroidization has been achieved using irregular particles in the size range from 20 mesh down to less than 150 mesh.

In carrying out the process in accordance with the present invention, the irregular metal particles are thoroughly mixed in a non-reactive matrix material to provide as uniform a distribution of the metal particles as possible prior to heating the resulting suspension. In addition to being chemically unreactive with the metal being processed, the matrix material should also be sufficiently high melting to preclude softening thereof at the operating temperatures. Moreover the matrix material should be such that it may be readily separated from the metal spheres upon completion of the spheroidizing operation. In general, matrix materials may consist of substances such as graphite, quartz, silicon carbide, zirconia, alumina, bone ash and similar materials all of which possess a relatively high degree of refractoriness, that is, a high melting or fusion temperature. While these substances are usually inert to most metals at a temperature corresponding to the melting point of the specific metal, those skilled in the art will readily recognize that in some instances the use of certain matrix materials may be more desirable than others. For example, although graphite is suitable for use with most non-ferrous metals some carburization may occur with ferrous metals at elevated temperatures, and in such instances the use of silicon carbide, zirconia or the like is preferable. The particle size of whatever matrix is utilized should preferably be fine enough so that 100% will pass through a 325-mesh screen. A matrix consisting of material much larger than 325 mesh has not been found to be conducive to producing spheres of perfect shape due to irregularities which are imparted to the metal.

For providing suspensions which are conducive to good results, approximately equal volumes of an appropriate matrix material of the type designated above and the irregular metal particles are used. Actually the amount of matrix material may be varied extensively the only requirement being that the suspended metal particles be predominantly out of contact with each other. In other words, it is important that each metal particle be insulated by the matrix material from adjacent particles to minimize the occurrence of agglomeration between the particles during the subsequent heating step. The substances may be intermixed by hand or by any suitable mechanical mixer designed for mixing dry materials.

The spheroidizing heat treatment of the suspension containing the irregular shaped particulates may be accomplished in any suitably sized heat resistant container into which the suspension is charged without packing. It is desirable that the suspension have a generally loose character. Preferably the suspension is placed as a relatively shallow layer in a pan-like container to enhance the rate and uniformity of heat penetration into the suspension. Care must be exercised to prevent segregation of the suspension during filling of the container as well as during the subsequent heat treatment. In this latter connection I have found that vibratory or other mechanical filling devices of a similar nature to be somewhat unsatisfactory and I prefer to fill the heat treatment container by hand-manipulated scoops or shovels. Thereupon, the container and its contents is placed in a furnace or muffle capable of attaining a temperature at least equivalent to the melting point of the metallic material to be spheroidized. It will be apparent that many furnaces of various types are readily adaptable for this purpose. In general an indirectly heated furnace or muffle further adapted for special atmosphere operation is preferred as, for example, electrically heated furnaces using resistance windings or rods. Satisfactory results may, however, also be obtained with indirectly heated fuel fired furnaces as long as adequate temperature control is possible.

In heating the suspension according to this invention, the irregular metal particles are raised to a temperature sufficiently high to cause their spheroidization while incorporated as a suspension in the hereintofore described matrix. As is known, it is a natural phenomenon of most substances to tend to assume a shape of least surface when free to do so as a result of inter-atomic and inter-molecular forces such as surface tension. Geometrically, the solid which exhibits the least surface volume for volume is a sphere. Although it is a common belief that the above mentioned physical forces are effective in causing a spheroidization of a substance only when there is almost complete freedom of atomic motion, that is when the substance is liquid or molten, it has been found that this is not entirely true, at least insofar as metals and alloys are concerned. Sufficient atomic or molecular freedom to permit physical spheroidization may also be achieved in what would appear to be solid metals whenever sufficient energy is imparted to the atoms or molecules which are normally locked in place in the crystalline lattice of the metal structure. Thus, effective spheroidization may take place with some metals, as for example with copper, at temperatures somewhat below the melting point. On the other hand, other metals need to be heated at least to their melting points or even somewhat higher before adequate spheroidization is achieved. In general, a heating temperature corresponding approximately to that required for incipient fusion of the metal or alloy is usually preferred, but it will be understood that, depending on the metallic material being treated, it may be somewhat below or above this temperature at least in some instances.

Timewise, the suspension need only be heated at the spheroidization temperature sufficiently long to assure that all portions of it and particularly the center are raised to that temperature. This will depend generally on the overall mass of the suspension and the nature of the heating equipment, but in any event is determined without difficulty in practice. While noble metals such as gold, silver, platinum and the like are readily spheroidized by the above described process, without any further precautions, other metals such as copper, tin, lead or the like are generally reactive with atmospheric oxygen when heated to or near their melting points. Still others such as titanium tend to react with nitrogen as well as oxygen at elevated temperatures. Because of this, the heating furnace is advantageously adapted for operation with a non-reactive protective gas atmosphere as, for example, carbon monoxide, hydrogen, helium, argon and the like by providing the furnace with suitable gas inlets through which the protective gas or gases may be introduced into the processing chamber of the furnace. If desired, protection of the metal being spheroidized can also be achieved by evacuating the heating furnace but this is a much more cumbersome procedure and the use of a positive gas atmosphere is preferable when such protection is necessary. In this connection, I have found that a protective atmosphere having a chemically reducing character as, for example, producer gas or cracked ammonia is of particular benefit in the process in that, simultaneously with the spheroidization treatment in accordance with this invention, there is a reduction of any surface oxide films which may have been present on the particles of starting material. Under such conditions of operation the resulting spheres are found to be perfectly clean, bright and of superior quality for any further utilization.

After spheroidization has been achieved in the above described manner, the suspension is cooled to a temperature low enough to permit convenient separation of the metallic spheres from the matrix material as, for example, by screening. When the nature of the metal has necessitated that spheroidization be carried out under a protective atmosphere, it is desirable to maintain a similar atmosphere until the suspension has cooled to a temperature low enough to permit its exposure to the atmosphere during separation of the metallic spheres from the matrix material. The latter material may usually be reused for processing additional batches of irregular metallic particles.

The invention is illustrated in the following examples, but is not to be construed as limited to the details described therein.

*Example 1*

About 100 grams of irregularly shaped electrolytically deposited copper particles were suspended in an equal volume of pulverulent silicon carbide all of which was fine enough to pass through a 325 mesh (U.S. Standard) screen by thoroughly mixing the copper powder and silicon carbide. The suspension was then transferred without packing or tamping into a shallow steel pan and the latter placed in an electrically heated muffle furnace preheated to 1750° F. The furnace was provided with a gas inlet for the introduction of a protective atmosphere consisting of a reform gas having about 15% carbon monoxide, 15% hydrogen and the balance nitrogen. Furnace temperature was then raised to 1900° F. (about 80° F. below the melting point of copper). After 23 minutes the suspension was determined to have reached furnace temperature whereupon the steel pan containing the suspension was removed and cooled to about 200° F. in a chamber provided with protective gas. Thereafter the now perfectly spherical copper powder particles were separated from the matrix by screening the suspension on a 325 mesh screen. A yield of 100% of the original weight of irregular copper particles, now in the form of perfect spheres, was obtained. The size distribution of the product compared to the starting material is shown in the tabulation below.

| Screen Size | Irregular Particles Treated (Size Fraction, Percent) | Spherical Particles Produced (Size Fraction, Percent) |
| --- | --- | --- |
| +20 mesh | 0.0 | .1 |
| −20, +40 mesh | 1.0 | 4.2 |
| −40, +60 mesh | 14.4 | 22.4 |
| −60, +80 mesh | 39.9 | 30.0 |
| −80, +100 mesh | 29.7 | 13.9 |
| −100, +150 mesh | 15.0 | 28.0 |
| −150 mesh | 0.0 | 1.4 |
| Total | 100.0 | 100.0 |

Example 2

In a manner analogous to that described for irregular copper particles in Example 1, 120 grams of irregular bronze particles, having a composition consisting of 10% tin and 90% copper were suspended in an equal volume of fine (minus 325 mesh) silicon carbide. After placing the suspension in a shallow steel pan, the pan and contents were placed in an electric muffle furnace preheated to 1800° F. and provided with a protective gas atmosphere as in Example 1. The temperature was then raised to 2000° F. (168° F. above the melting point of the bronze) and held for 8 minutes after which the suspension was cooled under gas cover. Upon separation of the matrix material from the metal particles the latter were found to be entirely spherical. A recovery of 96.3% of the original starting material was obtained. The loss is accounted for entirely by such spheres as were smaller than 325 mesh which in turn was unavoidable inasmuch as a roughly equivalent fraction of the starting material used (4.5%) originally was already smaller than 325 mesh as will be apparent from the comparison in the table below.

| Screen Size | Irregular Particles Treated (Size Fraction, Percent) | Spherical Particles Produced (Size Fraction, Percent) |
| --- | --- | --- |
| +20 mesh | | 2.8 |
| −20, +40 mesh | 20.2 | 25.7 |
| −40, +60 mesh | 20.7 | 21.7 |
| −60, +80 mesh | 13.7 | 13.1 |
| −80, +100 mesh | 5.7 | 5.1 |
| −100, +150 mesh | 12.4 | 10.8 |
| −150, +200 mesh | 10.9 | 9.5 |
| −200, +250 mesh | 2.1 | 1.5 |
| −250, +325 mesh | 9.8 | 6.1 |
| −325 mesh | 4.5 | ¹ 3.7 |
| Total | 100.0 | 100.0 |

¹ By difference.

I claim:

1. The process of producing spherical metallic particles from irregular shaped metallic particles which comprises uniformly dispersing said irregular particles in a loosely packed matrix material which is chemically unreactive with the metal particles and has a softening temperature above the melting point of said metallic particles to provide a suspension of said irregular metallic particles in the matrix material, heating said suspension to a temperature below the melting point of said particles said temperature being sufficient to spherify the irregular metallic particles in the absence of combustion of said matrix material, cooling said suspension, and separating the spherified metallic particles from the matrix material.

2. The process of claim 1 wherein the heating and cooling of the suspension is carried out in a gas atmosphere which is chemically unreactive with the metallic particles at a temperature corresponding approximately to the melting point of said metallic particles.

3. The process of claim 1 wherein the suspension is heated in a reducing gas atmosphere.

4. The process of claim 1 wherein the suspension is heated in a vacuum.

5. The process of producing spherical metallic particles from irregular shaped metallic particles which comprises uniformly dispersing said irregular particles in a loosely packed matrix of a refractory material which is unreactive with said particles and is non-combustible under the operating conditions involved, said refractory material being selected from the group consisting of graphite, quartz, zirconia, alumina, and silicon carbide, heating the resulting suspension to a temperature not exceeding the incipient fusion temperature of said metallic particles to spherify the irregular metallic particles, cooling said suspension and separating the spherified metallic particles from the matrix material.

6. The process of claim 5 wherein the particle size of the refractory matrix material is below 325-mesh screen size.

7. The process of claim 5 wherein the volume ratio of metallic particles to refractory material is about 1:1.

References Cited in the file of this patent

UNITED STATES PATENTS

| 857,756 | Reddy | June 25, 1907 |
| 1,717,160 | Kichline | June 11, 1929 |
| 2,038,251 | Vogt | Apr. 21, 1936 |
| 2,460,977 | Davis et al. | Feb. 8, 1949 |
| 2,461,011 | Taylor et al. | Feb. 8, 1949 |

FOREIGN PATENTS

| 486,778 | Great Britain | June 10, 1938 |
| 731,504 | Great Britain | June 8, 1955 |